United States Patent
Lev et al.

(10) Patent No.: US 8,251,373 B2
(45) Date of Patent: Aug. 28, 2012

(54) SEAL PERFORMANCE FOR HYDROGEN STORAGE AND SUPPLY SYSTEMS

(75) Inventors: Leonid C. Lev, West Bloomfield, MI (US); Dimitri A. Podorashi, Weiterstadt (DE); Michael J. Lukitsch, Marysville, MI (US); Thorsten Michler, Hofheim (DE); Xingcheng Xiao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 466 days.

(21) Appl. No.: 12/504,791

(22) Filed: Jul. 17, 2009

(65) Prior Publication Data

US 2011/0012313 A1    Jan. 20, 2011

(51) Int. Cl.
*F16J 15/12* (2006.01)
*F16J 15/32* (2006.01)

(52) U.S. Cl. ......... 277/647; 277/442; 277/456; 277/650

(58) Field of Classification Search .................. 277/443, 277/456, 650, 647
See application file for complete search history.

(56) References Cited

U.S. PATENT DOCUMENTS

| | | | | |
|---|---|---|---|---|
| 3,095,204 A * | 6/1963 | Neely | | 277/442 |
| 3,561,776 A * | 2/1971 | Wilson | | 277/647 |
| 3,901,517 A * | 8/1975 | Heathcott | | 277/556 |
| 4,133,542 A * | 1/1979 | Janian et al. | | 277/555 |
| 4,148,699 A | 4/1979 | Mayer et al. | | |
| 4,491,500 A | 1/1985 | Michaud et al. | | |
| 4,508,356 A * | 4/1985 | Janian | | 277/555 |
| 4,705,594 A | 11/1987 | Zobbi et al. | | |
| 4,818,333 A | 4/1989 | Michaud | | |
| 4,899,702 A * | 2/1990 | Sasaki et al. | | 123/193.6 |
| 5,158,629 A | 10/1992 | Zobbi | | |
| 5,163,692 A | 11/1992 | Schofield et al. | | |
| 5,303,683 A * | 4/1994 | Wittwer et al. | | 123/193.6 |
| 5,553,527 A | 9/1996 | Harrison | | |
| 5,598,763 A * | 2/1997 | Rao et al. | | 92/212 |
| 5,671,656 A * | 9/1997 | Cyphers et al. | | 92/172 |
| 5,813,674 A * | 9/1998 | Dickie et al. | | 277/395 |
| 5,909,879 A * | 6/1999 | Simpson | | 277/399 |
| 6,227,547 B1 * | 5/2001 | Dietle et al. | | 277/336 |
| 6,279,913 B1 * | 8/2001 | Iwashita et al. | | 277/442 |
| 6,283,478 B1 * | 9/2001 | Kumai et al. | | 277/435 |
| 6,439,203 B1 * | 8/2002 | Cooke | | 123/470 |
| 6,502,833 B1 * | 1/2003 | Shibata et al. | | 277/647 |

(Continued)

OTHER PUBLICATIONS

Written Opinion and International Search Report for application No. PCT/US2010/042034 dated Feb. 28, 2011.

*Primary Examiner* — Alison Pickard
(74) *Attorney, Agent, or Firm* — Reising Ethington P.C.

(57) ABSTRACT

The performance and durability of static and dynamic seals for hydrogen storage and supply systems has been improved by utilizing a spring-energized and plastic coated radial seal in combination with at least a mating surface that has been treated by one of a variety of procedures. These procedures include applying to the mating surface a low-friction, hard, and hydrogen impervious coating, chemically polishing the mating surface, and electrochemically polishing the mating surface. Each of these procedures significantly reduces, on a microscopic scale, the surface roughness of the mating surface. The seal can thus form a tighter and more gas-tight seal with the smoother mating surface so as to decrease the loss of hydrogen gas across the seal. The smoother mating surface can also improve seal life by reducing seal surface wear.

11 Claims, 2 Drawing Sheets

U.S. PATENT DOCUMENTS

| | | |
|---|---|---|
| 6,528,168 B1* | 3/2003 | Matsumoto et al. ........... 428/408 |
| 7,735,834 B2* | 6/2010 | Hofbauer ...................... 277/438 |
| 2004/0261866 A1 | 12/2004 | Suzuki et al. |
| 2009/0026712 A1* | 1/2009 | Kawanishi et al. ........... 277/443 |
| 2009/0181272 A1* | 7/2009 | Shin et al. ........................ 429/26 |
| 2009/0289418 A1* | 11/2009 | Cook ............................. 277/309 |
| 2010/0025939 A1* | 2/2010 | Horton et al. .................. 277/570 |
| 2010/0166582 A1* | 7/2010 | Racicot et al. ................. 417/437 |
| 2011/0006484 A1* | 1/2011 | Dietle et al. ................... 277/549 |
| 2011/0229791 A1* | 9/2011 | Kageyama et al. ............ 429/469 |
| 2011/0268946 A1* | 11/2011 | Fischer et al. ................. 428/217 |

* cited by examiner

SEAL PERFORMANCE FOR HYDROGEN STORAGE AND SUPPLY SYSTEMS

TECHNICAL FIELD

This invention pertains to the improved performance of static and dynamic seals in hydrogen storage and supply systems. More specifically, a spring-energized plastic seal may be sealingly engaged against at least an adjacent mating surface that has been treated to better accommodate the seal's contacting surface. The mating surface may be treated by applying a low-friction, hard, and hydrogen impervious coating thereto. The mating surface may also be treated by chemical or electrochemical polishing.

BACKGROUND OF THE INVENTION

Fuel cell technology has become a viable option for the automotive industry to generate power for vehicle operation. Certain types of fuel cells, such as proton exchange fuel cells (PEM fuel cells), generate electricity by delivering a flow of hydrogen gas to the anode side of a membrane-electrode-assembly and a flow of oxygen gas to the cathode side. A proton-conducting electrolyte sandwiched between the anode and cathode facilitates proton transport from the anode to the cathode while forcing electrons generated at the anode to move through an external circuit to reach the cathode. This external flow of electric current can be harnessed to drive an electric motor or other power-consuming device within the automobile. Many similar individual fuel cells may be stacked in series flow arrangement to produce a greater power supply, if necessary.

The hydrogen needed to operate a hydrogen-consuming fuel cell that helps power a vehicle is generally stored in an on-board storage device at pressures between 10 bar and 875 bar and at temperatures between −80° C. and 85° C. The fuel cell generally requires, however, a low and constant-pressure hydrogen supply that ranges from about 6 bar to about 12 bar at a load-dependent flow rate. To address this issue, flow control hydrogen pressure regulators, solenoid valves, and other devices that include dynamic and static seals may be incorporated into the vehicle's hydrogen storage and supply systems. These seals have to perform under constraints that are somewhat specific to hydrogen gas and fuel cell operation. For example, the use of lubricants at seal surface interfaces is quite limited because commonly-used lubricants tend to poison the fuel cell catalyst materials found in the anode and cathode and thus contribute to fuel cell performance degradation. As another example, the seals must be able to remain impermeable and withstand the low temperatures—down to around −80° C.—that result when hydrogen gas expands to meet the delivery pressure requirements of the fuel cell. The seal mating surfaces should also be as smooth as possible to avoid the formation of microscopic interstices through which the very small hydrogen gas molecules can escape.

Elastomer seals of a relatively low Young's modulus in conjunction with a heating mechanism have been used in the past for hydrogen storage and supply systems. The heating mechanism is needed because the higher flexibility elastomer seals become brittle and thus pervious to hydrogen gas as the hydrogen approaches its lower operating temperatures. Seals with a higher Young's modulus, and thus more rigidity, can perform adequately without a heating mechanism but are less able to tightly conform to the surface topography of the seal mating surface, and are more easily eroded when subjected to relative frictional movement against an adjacent non-lubricated surface. Hydrogen leakage and complications in hydrogen pressure management due to unreliable seal performance is thus a recurring issue for fuel cell hydrogen storage and supply systems. Better seal performance is therefore needed.

SUMMARY OF THE INVENTION

Hydrogen storage and supply systems associated with hydrogen-consuming fuel cells generally use a number of static and dynamic seals throughout their many components. For example, static and dynamic seals of various sizes and designs are used to seal the internal parts of hydrogen pressure regulators, to seal the internal parts of a variety of valves such as solenoid valves, and to seal hose, line and joint connections, to name but a few. While these and other similar components can range from simple to very complicated in terms of structural complexity, they are oftentimes shaped at some point for axial flow of hydrogen gas and therefore may contain generally round interior surfaces that need to be sealed. The highly diffusive nature of hydrogen gas as well as its cold operating temperatures can, however, promote hydrogen gas leakage across the seals located in these axial flow areas. To help address this issue, a spring-energized and plastic coated radial seal may be accommodated by at least a mating surface that has been treated to improve the seal's durability and susceptibility to hydrogen gas leakage. The mating surface may be treated by applying to it a low-friction, hard, and hydrogen impervious layer. The mating surface may also be treated by chemical polishing or electrochemical polishing. Other surfaces engaged by the seal, such as a seal gland surface, can also be similarly treated.

The spring-energized and plastic coated radial seal may be of any general construction appropriate for the particular sealing application being contemplated. The seal may generally include a relatively rigid plastic jacket that at least partially surrounds a spring or other load-exerting element. The plastic jacket may include a heel portion and pair of flexible sealing lips with an inner and outer surface. The inner surface of the sealing lips may at least partially define a groove for receiving the spring. A constant force supplied by the spring against the inner surface of the sealing lips may flex the sealing lips radially outwardly and bias the outer surface of the sealing lips against an adjacent mating surface and an oppositely adjacent seal gland surface. The gas pressure available to the seal may further increase this biasing force and thus, at higher gas pressures, promote tighter sealing engagement between the outer surface of the sealing lips and their adjacent surfaces. The plastic jacket may be constructed from relatively rigid plastic materials that include, but are not limited to, high performance polymers such as filled and non-filled polytetrafluoroethylene (PTFE) compounds and ultra-high molecular weight polyethylene (UHMW-PE).

The spring may be of any design and construction that can provide a reliable load force sufficient to radially outwardly flex the sealing lips of the plastic jacket. One particular type of spring design that can be used is cantilevered spring having a "V-shaped" cross section. This spring design basically emulates the groove in the plastic jacket and allows the spring load to be applied almost entirely at the leading ends of the plastic jacket's sealing lips. Of course other spring designs, such as coiled and helical springs, can be used with the plastic jacket. The spring may be constructed from any suitable material including, but not limited to, stainless steel and similar metal alloys.

The seal mating and seal gland surfaces should be provided with low surface roughness for optimal sealing engagement. These surfaces are generally metal surfaces which contact the plastic jacket of the seal to manage the flow and pressure of hydrogen gas. For example, industry recommendations generally state that the surface roughness should not exceed about 6 microinches for a dynamic mating surface and about 12 microinches for a static mating or seal gland surface when the media to be sealed is hydrogen gas. Seal mating or gland surfaces with a surface roughness that exceeds these recommendations tend to result in the formation of microscopic leak paths. This is because the seal is unable to sufficiently compliment the larger inter-asperity voids on the mating or gland surface through which hydrogen gas can likely pervade. Rougher dynamic mating surfaces can also expedite wearing of the seal surfaces and lead to a decrease in seal life and possibly a greater hydrogen leakage rate across the seal.

Several treatment procedures have thus been developed for treating at least the seal mating surface to provide it with a low surface roughness finish that can better accommodate the outer surfaces of the plastic jacket's sealing lips. These procedures help provide smoother surfaces than standard mechanical polishing techniques such as grinding and buffing. The ability to further reduce the surface roughness of a seal mating surface can, in turn, facilitate a better seal between the mating surface and the outer surfaces of the sealing lips, decrease hydrogen leakage across the seal, reduce wear of the outer plastic seal surfaces, and improve the reliability of hydrogen gas pressure management in hydrogen storage and supply systems.

One embodiment of a treatment procedure involves applying a low-friction, relatively hard, and hydrogen impervious coating to a seal mating surface. For example, a coating of diamond-like-carbon (DLC) may be deposited over the seal mating surface by a type of physical vapor deposition or chemical vapor deposition. As another example, a coating of nanocrystalline diamond may be deposited over the seal mating surface by a type of chemical vapor deposition. An additional layer may also be applied between the seal mating surface and the DLC/nanocrystalline diamond coating, if desired, to provide another hard and wear resistant layer to improve the bonding strength of DCL or nanocrystalline diamond. This additional layer may be composed of, for example, a nitride, carbide, or boride based compound such as TiN, TiC, CrN, CrC, AlN, and $TiB_2$, an alloy fabricated from metals such as Ti, Cr, Mo, W, or another material exhibiting similar characteristics such as refractory materials. The Ti—N based metal compound layer may be deposited onto the seal mating surface by either a type of physical or chemical vapor deposition.

Other embodiments of a treatment procedure involve polishing a seal mating surface either chemically or electrochemically. These particular polishing procedures are quite appropriate for soft metals such as 316L stainless steel alloys.

A chemical polishing technique that may be utilized is isotropic finishing. This technique is known to skilled artisans and generally involves submerging the part that includes the seal mating surface into a suitable isotropic chemical bath that is being agitated. The isotropic chemical bath generally comprises an acidic medium and an appropriate supply of abrading elements. The composition of the isotropic chemical bath and the constant agitation progressively erode the surface asperities on the mating surface and thus significantly reduce its surface roughness on a microscopic scale. Afterwards, the mating surface may be submerged in a burnishing liquid bath that is agitated similarly to the isotropic chemical bath. The burnishing liquid bath generally comprises a basic medium that neutralizes any remaining isotropic chemical residue on the mating surface.

An electrochemical polishing technique that may be utilized is electropolishing. This technique—also sometimes referred to as "reverse plating"—is known to skilled artisans and generally involves forming an electrochemical cell where the part that includes the seal mating surface is submerged into an electropolishing bath as the anode (positive terminal). Other metal substrates are likewise submerged as the cathode (negative terminal). The electropolishing bath, which may comprise an electrolytic solution, may be controllably heated if desired. An electric current is then applied to the electrodes from an appropriate power source. Such an electrochemical cell progressively removes surface material from the seal mating surface—more so at the peaks of the surface asperities—by way of anodic dissolution. The surface roughness of the mating surface is thus significantly reduced and deburred as a result.

Further exemplary embodiments and specific examples of the invention will be described or become apparent from the detailed description that follows.

DESCRIPTION OF PREFERRED EMBODIMENTS

The performance and durability of static and dynamic seals within hydrogen storage and supply systems can be improved using a spring-energized and plastic coated radial seal that engages a mating surface that has been treated by at least one of a variety of procedures. These treatment procedures include applying a hard, low-friction and hydrogen impervious layer to the seal mating surface, isotropic finishing, and electropolishing. The combination of this seal construction and the treatment of the seal mating surface helps reduce hydrogen leakage at the interface of the seal and the mating surface, and also helps reduce the onset of seal surface abrasions and wear particularly when the use of lubricants is prohibited. While the following discussion focuses primarily on treating seal mating surfaces, it is to be understood that other seal engaging surfaces—most notably seal gland surfaces—may also be treated with the disclosed treatment procedures to achieve similar results.

Figure 1:
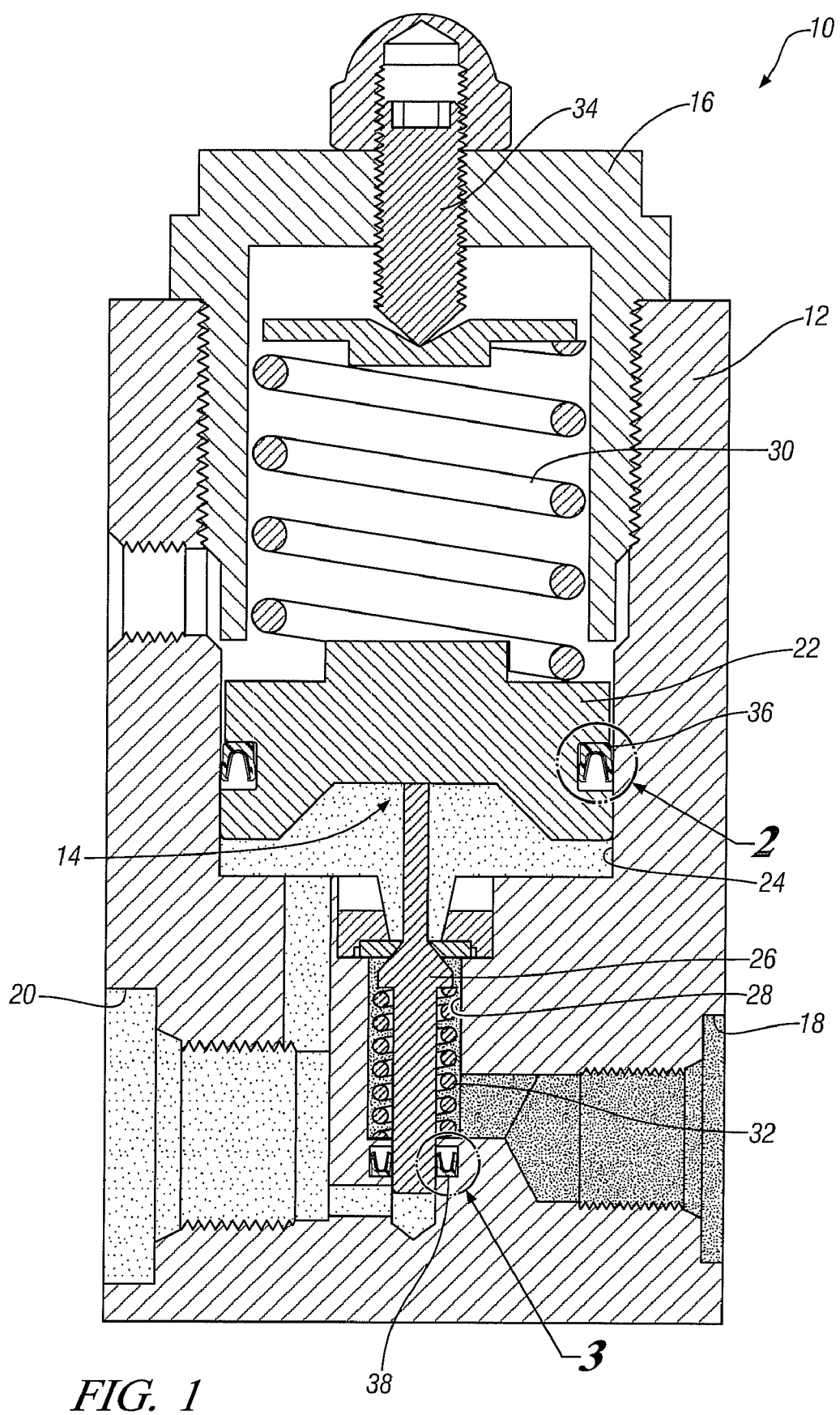
FIG. 1 is a cross-sectional view of an exemplary hydrogen pressure regulator that includes a dynamic rod seal and a dynamic piston seal according to at least one embodiment of the invention.

FIG. 1 shows an illustrative and cross-sectional view of a hydrogen gas pressure regulator 10 as an example of an instance where a seal may be needed in a hydrogen storage and/or hydrogen supply system. The hydrogen gas pressure regulator shown here comprises, in general, a regulator body 12, a rod and piston assembly 14, and a closure cap 16. The regulator body 12 defines a hydrogen gas inlet 18 and a hydrogen gas outlet 20. The hydrogen gas inlet 18 receives a flow of hydrogen gas from a relatively high and possibly variable pressure source, such as a hydrogen storage tank. The hydrogen gas outlet 20, on the other hand, delivers a flow of hydrogen gas to a device that requires a lower pressure and more constant hydrogen gas feed, such as a fuel cell. The hydrogen gas pressure in both the hydrogen gas inlet 18 and the hydrogen gas outlet 20 is managed by the rod and piston assembly 14. Here, the rod and piston assembly 14 is housed within the regulator body 12 and enclosed therein by the closure cap 16. The regulator body 12 and the closure cap 16 may be secured together in any suitable manner such as, for example, the threaded connection shown in FIG. 1.

The rod and piston assembly 14 generally includes a piston 22 that defines a low pressure chamber 24 associated with the hydrogen gas outlet 20, and a rod 26 disposed in a high pressure chamber 28 associated with the hydrogen gas inlet 18. The piston 22 and the rod 26 are coupled together to form a mechanical link between the low pressure chamber 24 and the high pressure chamber 28. The piston and rod assembly 14 controls the pressure of hydrogen gas exiting the hydrogen gas outlet 20 by reciprocating in response to the pressure differential between the hydrogen gas inlet 18 and the hydrogen gas outlet 20 and the biasing forces of a manually-loaded spring 30 acting on the piston 22 and a preset spring 32 acting on the rod 26. The biasing force of the manually-loaded spring 30 is controllable by an adjustable screw 34 or other mechanical mechanism located on the closure cap 16. Because the hydrogen pressure regulator 10 shown here in FIG. 1—and many others similar to it—are known to skilled artisans, a more detailed and complete discussion of its construction and operation is not necessary here.

Figure 2:
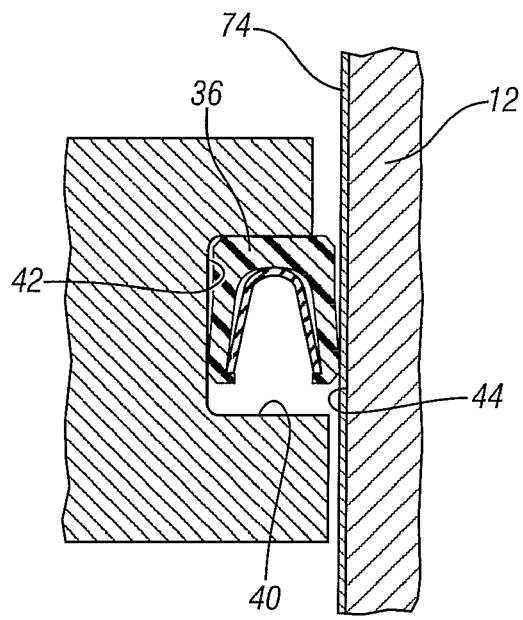
FIG. 2 is an enlarged partial cross-sectional view of the dynamic piston seal shown in FIG. 1.
Figure 3:
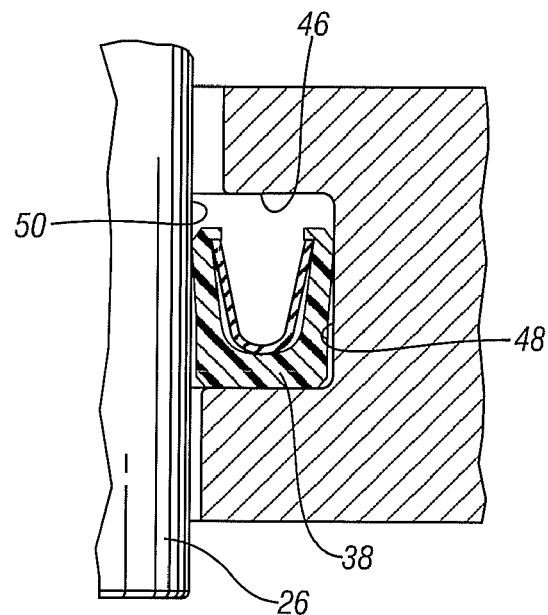
FIG. 3 is an enlarged partial cross-sectional view of the dynamic rod seal shown in FIG. 1.

The rod and piston assembly 14 of the hydrogen pressure regulator 10 comprises a pair of dynamic seals—a piston seal 36 and a rod seal 38—that are best shown installed in FIGS. 2 and 3, respectively. The piston seal 36 seals the low pressure chamber 24 against the loss of hydrogen gas pressure to the part of the hydrogen pressure regulator 10 where the manually-loaded spring 30 is located. The piston seal 36 is seated in a seal gland 40 defined by the piston 22. The seal gland 40 includes at least one seal gland surface 42 that forms a static sealing engagement with the seal 36. As a result of this particular configuration, the piston seal 36 reciprocates with the piston 22 and remains in dynamic sealing contact with a seal mating surface 44 that encompasses a portion of the inner surface of the regulator body 12.

The rod seal 38, on the other hand, seals the high pressure chamber 28 against the loss of hydrogen gas pressure to the hydrogen gas outlet 20. Unlike the piston seal 36, however, the rod seal 38 does not reciprocate with the rod 26. The rod seal 38 is seated in a seal gland 46 defined by the regulator body 12. The seal gland 46, much like the seal gland 42 in the piston 22, also includes at least one seal gland surface 48 that forms a static sealing engagement with seal 38. The rod seal 38 thus remains in dynamic sealing contact with a rod seal mating surface 50 that encompasses a portion of the outer surface of the rod 26. Although the hydrogen pressure regulator 10 shown here utilizes only dynamic seals, there are many pressure regulator designs that utilize only static seals or some combination of static and dynamic seals. This discussion is thus applicable to static seals as much as it is to dynamic seals since the same benefits can be realized for both kinds of seals through the practice of this invention.

Figure 4:
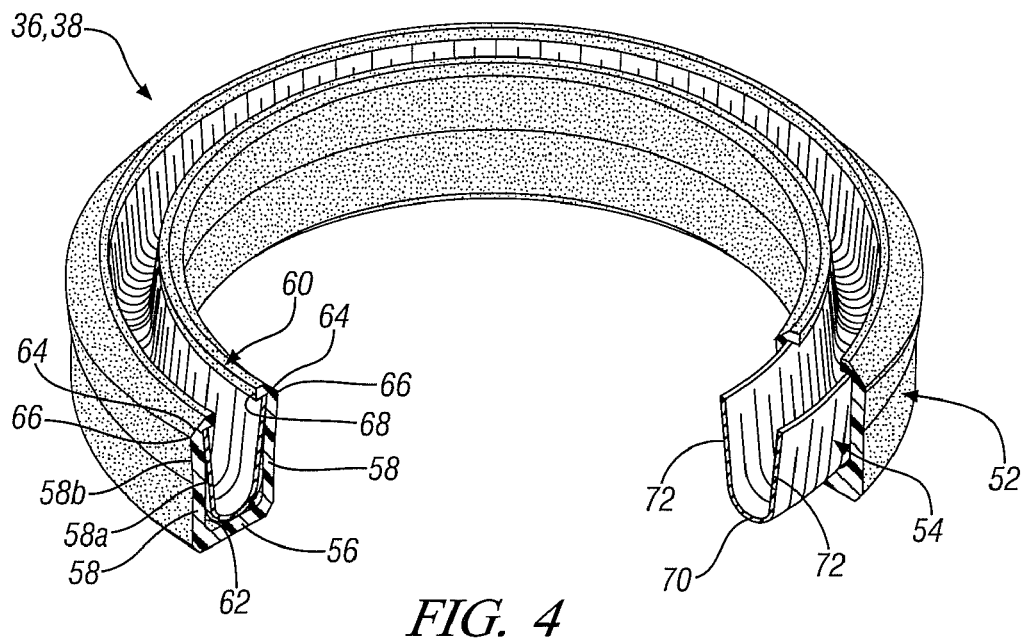
FIG. 4 is a partial perspective view of the particular seal construction employed as the piston seal of FIGS. 1 and 2 and the rod seal of FIGS. 2 and 3. A portion of the plastic jacket has been cut away to in this Figure to provide a clearer view of the spring that is received by the plastic jacket.

As best shown in FIG. 4, both the piston and rod seals 36, 38 may be a spring-energized and plastic coated radial seal that generally includes a plastic jacket 52 and a spring 54. Such a seal 36, 38 is available from the Parker Hannifin Corporation under the tradename FlexiSeal®. While a variety of jacket profiles are known and available, the plastic jacket 52 shown here comprises a heel portion 56 and a pair of flexible sealing lips 58 that have a leading end 60 opposite the heel portion 56. Each sealing lip 58 may include an inner surface 58a and an outer surface 58b. The inner surfaces 58a of the sealing lips 58 may at least partially define a groove 62 for receiving the spring 54. The outer surfaces 58b of the sealing lips 58 may comprise a chamfered edge 64 near the leading end 60 that culminates in a load point 66. The primary gas-tight seal formed by the seal 36, 38 is generally attributed to the load point 66 of both sealing lips 58 being radially compressed by the spring 54 against their respective adjacent sealing surfaces—namely, the mating surface 44, 50, and the seal gland surface 42, 48. The leading end 60 of the sealing lips 58 may further include a retention rim 68 to help hold the spring 54 in place within the groove 62 and to concentrate the radial force exerted by the spring 54 to the load points 66. The sealing lips 58, as shown, may be generally symmetric in cross-section so that the two sealing lips 58 form substantially equivalent seals regardless of which sealing lip 58 engages the mating surface 44, 50 and which sealing lip engages the seal gland surface 42, 48. Thus, the same spring-energized and plastic coated radial seal design can be employed as the piston seal 36 of FIG. 2 and the rod seal 38 of FIG. 3 even though the two seals 36, 38 engaged their respective dynamic mating surfaces 44, 50 with opposite sealing lips 58 (innermost sealing lip versus outermost sealing lip).

The plastic jacket 52 may be constructed from a relatively rigid plastic material such as, but are not limited to, high performance polymers such as filled and non-filled polytetrafluoroethylene (PTFE) compounds and ultra-high molecular weight polyethylene (UHMW-PE). These more rigid plastic materials—as compared to common elastomer materials such as nitrile, neoprene, and fluoropolymer seal materials—exhibit certain characteristics that are more appropriate for the sealing of hydrogen gas. For example, the rigid plastic materials just mentioned (1) can endure very low temperatures (down to −267° C. for PTFE and −217° C. for UHMW-PE) without sacrificing structural integrity; (2) can glide over rough surfaces and avoid being easily scraped or frayed; (3) exhibit self-lubricating capabilities in dynamic dry running sealing applications; and (4) can better resist material degradation and heat-aging during temperature cycling.

The spring 54 is a cantilevered spring having a "V-shaped" cross-section that generally includes a base 70 and a pair of beam legs 72. The base 70 sits against the heel portion 56 of the plastic jacket 52 and helps support and position the spring 54 within the groove 62. The spring energy stored in the base 70 is transferred by the beam legs 72 to the leading ends 60 of the sealing lips 58. The retention rims 68 hold the beam legs 72 against the inner surfaces 58a of the sealing lips 58 in a slightly convex position to help concentrate the spring's 54 radial load force to the load points 66. The spring 54 thus compresses the load point 66 of one sealing lip 58 tightly against the mating surface 44, 50 and the load point 66 of the other sealing lip 58 tightly against seal gland surface 42, 50 to form an overall hydrogen gas-tight seal. The gas pressure available to the seal 36, 38 may further increase this radial compressive force and thus, at higher gas pressures, promote tighter sealing engagement at the load point 66 of the sealing lips 58. The seal 36, 38 can even compensate for normal wearing of the load points 66 so as to preserve a gas-tight seal. This is because the resilient spring 54, through the spring's 54 constant radial load and/or available gas pressure, can expand and further radially outwardly bias the sealing lips 58 towards the mating surface 44, 50 and the seal gland surface 42, 48 as the load point 66 wears and becomes thinner. The spring 54 may be constructed from any suitable material including, but not limited to, 300 series stainless steal or other similar metal alloys such as Elgiloy® and Hastelloy®. Other spring designs besides the cantilevered "V-shaped" spring can also be used in conjunction with the plastic jacket 52. These designs include canted coiled springs and helical springs, to name a few examples.

To better accommodate the load point 66 of the sealing lips 58, at least the seal mating surface 44, 50 may be treated to provide a low surface roughness finish that can enhance the performance and durability of the seal 36, 38. Several such treatment procedures have been developed. The first procedure involves applying a low-friction, hard, and hydrogen impervious coating to the seal mating surface 44, 50. The second procedure involves chemically polishing the seal mating surface 44, 50 by isotropic finishing. The third procedure involves electrochemically polishing the seal mating surface 44, 50 by electropolishing. Each of these procedures help provide smoother surfaces that, in turn, can facilitate a better seal between the mating surface 44, 50 and the load point 66 of the sealing lips 58, decrease hydrogen leakage across the seal 36, 38, reduce erosion of the load point 66, and improve the reliability of hydrogen gas pressure management in hydrogen storage and supply systems. Again, the seal gland surfaces 42, 48 can be treated as well, if desired, to achieve the same results.

In the first treatment procedure embodiment, a low-friction, relatively hard, and hydrogen impervious coating may be applied to the seal mating surface 44, 50. For example, a coating of diamond-like-carbon (DLC) may be employed. DLC, in general, is an amorphous carbon composite material that displays some of the desirable physical properties of natural diamond. The coating of DLC may be deposited onto the mating surface 44, 50 by a type of physical vapor deposition method such as high temperature vacuum evaporation or plasma sputter bombardment. As another example, a coating of nanocyrstalline diamond may be employed. Nanocrystalline diamond, in general, is similar to DLC except for the fact that it comprises a larger diamond and smaller graphite constituency. The nanocrystalline diamond coating may be deposited onto the mating surface 44, 50 by a type of chemical vapor deposition such as microwave plasma enhanced chemical vapor deposition. The coating of DLC or nanocrystalline diamond substantially reduces the surface roughness of the mating surface 44, 50 by first filling the inter-asperity voids on the mating surface 44, 50 and then overflowing into a very smooth and low friction surface. The smoother surface formed by the DLC or nanocrystalline coating can facilitate a tighter and more hydrogen leak-proof seal with the load point 66 of the seal 36, 38. This is because the load point 66 can more easily deform to correspondingly engage the smoother DLC or nanocrystalline coating surface when compressed by the spring 54. The thickness of any DLC or nanocrystalline coating may range from about 1 to about 10 micrometers, and preferably from about 1 to about 2 micrometers. An idealized representation of such a coating is shown as reference numeral 74 in FIG. 2, for example.

The deposition of a DLC coating or a nanocrystalline diamond coating over the seal mating surface 44, 50 is all that may be necessary in some situations. For instance, a DLC or nanocrystalline coating can generally form a sufficient and sturdy bond with a seal mating surface 44, 50 composed of an iron alloy such as stainless steel. But if desired, additional layers may be deposited between the seal mating surface 44, 50 and the DLC or nanocrystalline diamond coating. Such additional layers may be applied to provide an additional wear resistant and hard layer underneath the DLC or nanocrystalline coating, or to provide a bonding layer for improved adherence of the DLC or nanocrystalline coating and the seal mating surface 44, 50. An example of a material that may be applied between the seal mating surface 44, 50 and the DLC or nanocrystalline diamond coating is a titanium nitride (Ti—N) based compound. These compounds may generally be deposited onto the seal mating surface 44, 50 by either a type of physical vapor deposition or chemical vapor deposition. Other appropriate nitride, carbide, and boride compounds such as such as TiC, CrN, CrC, AlN, and $TiB_2$ may also be used in a similar manner. Alloys fabricated from metals such as Ti, Cr, Mo, W may also be used, as well as other suitable materials such as refractory materials.

In the second treatment procedure embodiment, the seal mating surface 44, 50 may be chemically polished by isotropic finishing. This chemical polishing procedure generally involves submerging the part that includes the mating surface 44, 50 into an isotropic chemical bath and then a burnishing liquid bath, with both baths being agitated by a shaking or vibrating apparatus. REM Chemicals of Southington, Conn. is one company with considerable expertise in the field of isotropic finishing. It has acquired various patents—such as U.S. Pat. Nos. 4,491,500, 4,705,594, 4,818,333, and 5,158,629—that describe the basics of isotropic finishing in greater detail than is provided here.

The isotropic chemical bath generally comprises an acidic medium and an appropriate supply and mixture of abrading elements. For example, an isotropic chemical bath having a pH of approximately 1.5 and a quantity of suspended ceramic elements is generally appropriate if the mating surface 44, 50 is composed of stainless steel. Once submerged, the acidic medium reacts with the stainless steel of the mating surface 44, 50 to form a soft protective surface coating about 1 micron thick. The hard ceramic particles, however, easily remove this protective coating through random collisions brought about by the agitation of the isotropic chemical bath. Another protective surface coating is then formed on the newly exposed stainless steel and again removed by the ceramic elements. This repeated formation and removal of the protective surface coating progressively erodes the surface asperities on the mating surface 44, 50 as the relatively large ceramic elements grind away the higher surface elevations first. The mating surface 44, 50 may remain submerged in the isotropic chemical bath being subjected to agitation until it achieves a substantially isotropic surface finish of very low surface roughness.

The mating surface 44, 50 may then be submerged in a burnishing liquid bath that comprises a basic medium after removal from the isotropic chemical bath. An appropriate burnishing liquid bath for stainless steel has a pH of approximately 8.5. The burnishing liquid bath neutralizes any isotropic chemical bath drag-out and removes any protective surface coating remnants from the mating surface 44, 50. The surface roughness of the mating surface 44, 50 may have a Ra value of 3 microinches or less after removal from the burnishing liquid bath. The very smooth and low-friction mating surface 44, 50 produced by isotropic finishing offers the same benefits as the DLC/nanocrystalline coating previously discussed. That is, the chemically polished mating surface 44, 50 can facilitate a tighter and more hydrogen leak-proof seal with the load point 66 of the seal 36, 38.

In the third treatment procedure embodiment, the seal mating surface 44, 50 may be electrochemically polished by electropolishing. This electrochemical polishing procedure generally involves forming an electrochemical cell where the part that includes the mating surface 44, 50 is submerged into a temperature controlled electropolishing bath as the anode (positive terminal). Other metal plates or substrates such as those of lead, copper, or bronze are also submerged in the electropolishing bath to serve as the cathode (negative terminal). The electropolishing bath is oftentimes a highly concentrated acidic bath such as a mixture of sulfuric acid and phosphoric acid. It should be noted, however, that a number of electropolishing bath solutions are available including those described in U.S. Pat. No. 4,148,699 to Heritage Silversmiths Ltd. and U.S. Pat. No. 5,553,527 to Harrison, which are appropriate if the mating surface 44, 50 is composed of stainless steel.

Once the electrochemical cell is constructed, a DC power source is used to pass an electric current from the mating surface 44, 50 serving as part of the anode to the cathode through the electropolishing bath. This causes metal on the mating surface 44, 50 to oxidize and dissolve into solution while a corresponding reduction reaction, usually hydrogen evolution, takes place at the cathode. Surface material is thus progressively removed from the mating surface 44, 50 through anodic dissolution. In fact, surface material is generally removed from the peaks of the surface asperities faster since the current density across the mating surface 44, 50 is generally greater at higher surface roughness elevations than at lower ones. And current density is directly proportional to the electropolishing anodic dissolution reaction. The surface roughness of the mating surface 44, 50 is thus significantly reduced and deburred during electropolishing. Other benefits to the mating surface 44, 50 as a corollary of electropolishing include improved corrosion resistance, reduced susceptibility to product build-up and adhesion, and better heat reflection. Following electropolishing, the mating surface 44, 50 can facilitate a tighter and more hydrogen leak-proof seal with the load point 66 of the seal 36, 38 in the same manner as the previously discussed embodiments.

The above description of various embodiments of the invention is merely exemplary in nature and is not intended to limit the scope of the invention, its application, or its uses.

The invention claimed is:

1. A method of improving the performance and durability of a seal within a hydrogen storage or hydrogen supply system, in which substantially only hydrogen gas is stored or supplied, the method comprising:
   providing a spring-energized and plastic coated radial seal that comprises a plastic jacket and a spring, the plastic jacket comprising a pair of flexible sealing lips that each comprise an inner surface at least partially defining a groove and an outer surface that includes a load point, the spring being received in the groove and comprising a pair of beam legs that provide a radial load force to the to the flexible sealing lips;
   providing a component of the hydrogen storage or hydrogen supply system that comprises a seal mating surface against which the load point of the spring-energized and plastic coated radial seal engages to form a seal against the loss of hydrogen gas from the component;
   treating the seal mating surface with a procedure to provide the mating surface with a low surface roughness appropriate for sealing hydrogen gas in combination with the spring-energized and plastic coated radial seal, the procedure comprising at least one of: (a) applying a coating of diamond-like-carbon or nanocrystalline diamond over the seal mating surface for engagement with the load point; (b) chemically polishing the seal mating surface by isotropic finishing; or (c) electrochemically polishing the seal mating surface by electropolishing.

2. The method of claim 1, wherein plastic jacket of the spring-energized and plastic coated radial seal is composed primarily from polytetrafluoroethylene or ultra-high molecular weight polyethylene.

3. The method of claim 1, wherein the component of the hydrogen storage or hydrogen supply system is a hydrogen gas pressure regulator.

4. The method of claim 1, wherein applying the coating of diamond-like-carbon or nanocrystalline diamond comprises first applying a layer of a titanium nitride based compound to the seal mating surface, and then applying the coating of diamond-like carbon or nanocrystalline diamond over the layer of a titanium nitride based coating.

5. The method of claim 1, wherein chemically polishing the mating surface by isotropic finishing comprises first submerging the mating surface in an isotropic chemical bath that comprises an acidic medium and abrading elements, vibrating the isotropic chemical bath when the mating surface is submerged therein, and then submerging the mating surface in a burnishing liquid bath that comprises a basic medium.

6. The method of claim 1, wherein electrochemically polishing the mating surface by electropolishing comprises submerging the mating surface into an electropolishing bath as an anode and passing an electric current from the mating surface to a cathode.

7. A component of a hydrogen storage or a hydrogen supply system that comprises a seal and a seal mating surface that are engaged, either statically or dynamically, to seal against the loss of hydrogen gas between the seal and the seal mating surface, the component comprising:
   a spring-energized and plastic coated radial seal that comprises a plastic jacket and a spring, the plastic jacket comprising a pair of flexible sealing lips that each comprise an inner surface at least partially defining a groove and an outer surface that includes a chamfered edge culminating in a load point, the spring being received in the groove and comprising a pair of beam legs that provide a radial load force to the to the flexible sealing lips, and wherein the plastic jacket is composed primarily from polytetrafluoroethylene or ultra-high molecular weight polyethylene; and
   a seal mating surface adjacent to spring-energized and plastic coated radial seal that sealingly engages the load point thereof, the load point being radially compressed against the seal mating surface at least in part by the radial load force provided by the spring;
   wherein the seal mating surface has been treated by a procedure that provides the seal mating surface with a surface roughness below about 12 Ra microinches to seal, in combination with the spring-energized and plastic coated radial seal, against the loss of hydrogen gas.

8. The component of claim 7, wherein the seal mating surface has been treated by applying a coating of diamond-like-carbon or nanocrystalline diamond over the seal mating surface for engagement with the load point.

9. The component of claim 7, wherein the seal mating surface has been treated by applying a layer of a titanium nitride based compound to the seal mating surface, and then applying a coating of diamond-like-carbon or nanocrystalline diamond over the layer of a titanium nitride based compound for engagement with the load point.

10. The component of claim 7, wherein the seal mating surface has been treated by chemically polishing the seal mating surface by isotropic finishing.

11. The component of claim 7, wherein the seal mating surface has been treated by electrochemically polishing the seal mating surface by electropolishing.

* * * * *